US009504000B2

(12) United States Patent
Colby et al.

(10) Patent No.: US 9,504,000 B2
(45) Date of Patent: Nov. 22, 2016

(54) TRILATERATION PROCESSING OF ABNORMAL LOCATION DATA

(71) Applicants: Robert A. Colby, Granite Bay, CA (US); Sigal Louchheim, El Dorado Hills, CA (US); Justin Lipman, Shanghai (CN); Xiaoyong Pan, Shanghai (CN)

(72) Inventors: Robert A. Colby, Granite Bay, CA (US); Sigal Louchheim, El Dorado Hills, CA (US); Justin Lipman, Shanghai (CN); Xiaoyong Pan, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/126,793

(22) PCT Filed: Dec. 28, 2012

(86) PCT No.: PCT/CN2012/087828
§ 371 (c)(1),
(2) Date: Aug. 6, 2014

(87) PCT Pub. No.: WO2014/101099
PCT Pub. Date: Jul. 3, 2014

(65) Prior Publication Data
US 2014/0349674 A1 Nov. 27, 2014

(51) Int. Cl.
*H04W 24/00* (2009.01)
*H04W 64/00* (2009.01)
(Continued)

(52) U.S. Cl.
CPC .............. *H04W 64/00* (2013.01); *G01S 5/021* (2013.01); *G01S 5/14* (2013.01); *H04W 4/02* (2013.01); *G01S 5/0268* (2013.01); *G01S 5/0278* (2013.01)

(58) Field of Classification Search
CPC .... H04W 24/08; H04W 64/00; G01S 5/0263
USPC ............. 455/456.1–457; 370/252; 342/357.2
See application file for complete search history.

(56) References Cited

U.S. PATENT DOCUMENTS

2001/0022558 A1* 9/2001 Karr, Jr. .................. G01S 1/026
342/450
2005/0280576 A1* 12/2005 Shemesh ................. G01S 19/24
342/357.64
2006/0220954 A1* 10/2006 Hunt ....................... G01S 19/48
342/357.31

(Continued)

FOREIGN PATENT DOCUMENTS

CN 101986758 3/2011
CN 102540140 7/2012

OTHER PUBLICATIONS

International Search Report and Written Opinion for International Application No. PCT/CN2012/087828 dated Sep. 19, 2013,whole document.

*Primary Examiner* — Thomas Lett
(74) *Attorney, Agent, or Firm* — Blakely, Sokoloff, Taylor & Zafman LLP

(57) ABSTRACT

Embodiments of the invention address how trilateration processes, used to obtain a location of a mobile computing device, are affected by physical placement and sub-optimal selection of peer devices (PDs). Embodiments of the invention describe processes for selecting nearest PDs over further PDs, as received signal strength indicator (RSSI) measurements are more reliable—i.e., said "nearest PDs" provide more accurate distance measurements while improving the probability of finding more intersection points. Embodiments of the invention selectively utilize abnormal location poll data when executing location determination processes. Embodiments of the invention further enhance trilateration processes by utilizing dampening values for calculated location poll data.

20 Claims, 10 Drawing Sheets

(51) Int. Cl.
*H04W 4/02* (2009.01)
*G01S 5/02* (2010.01)
*G01S 5/14* (2006.01)

(56) References Cited

U.S. PATENT DOCUMENTS

| | | | | |
|---|---|---|---|---|
| 2010/0201567 A1* | 8/2010 | Lydon | ................... | H04W 8/24 342/357.22 |
| 2011/0045844 A1* | 2/2011 | Muller | ................... | G01S 5/0205 455/456.1 |
| 2011/0241935 A1* | 10/2011 | Miocinovic | ............ | G01C 21/30 342/357.31 |
| 2011/0244881 A1 | 10/2011 | Bando et al. | | |
| 2011/0250903 A1* | 10/2011 | Huang | ................... | G01S 5/0263 455/456.1 |
| 2012/0190380 A1* | 7/2012 | Dupray | ................... | G01S 1/026 455/456.1 |

* cited by examiner

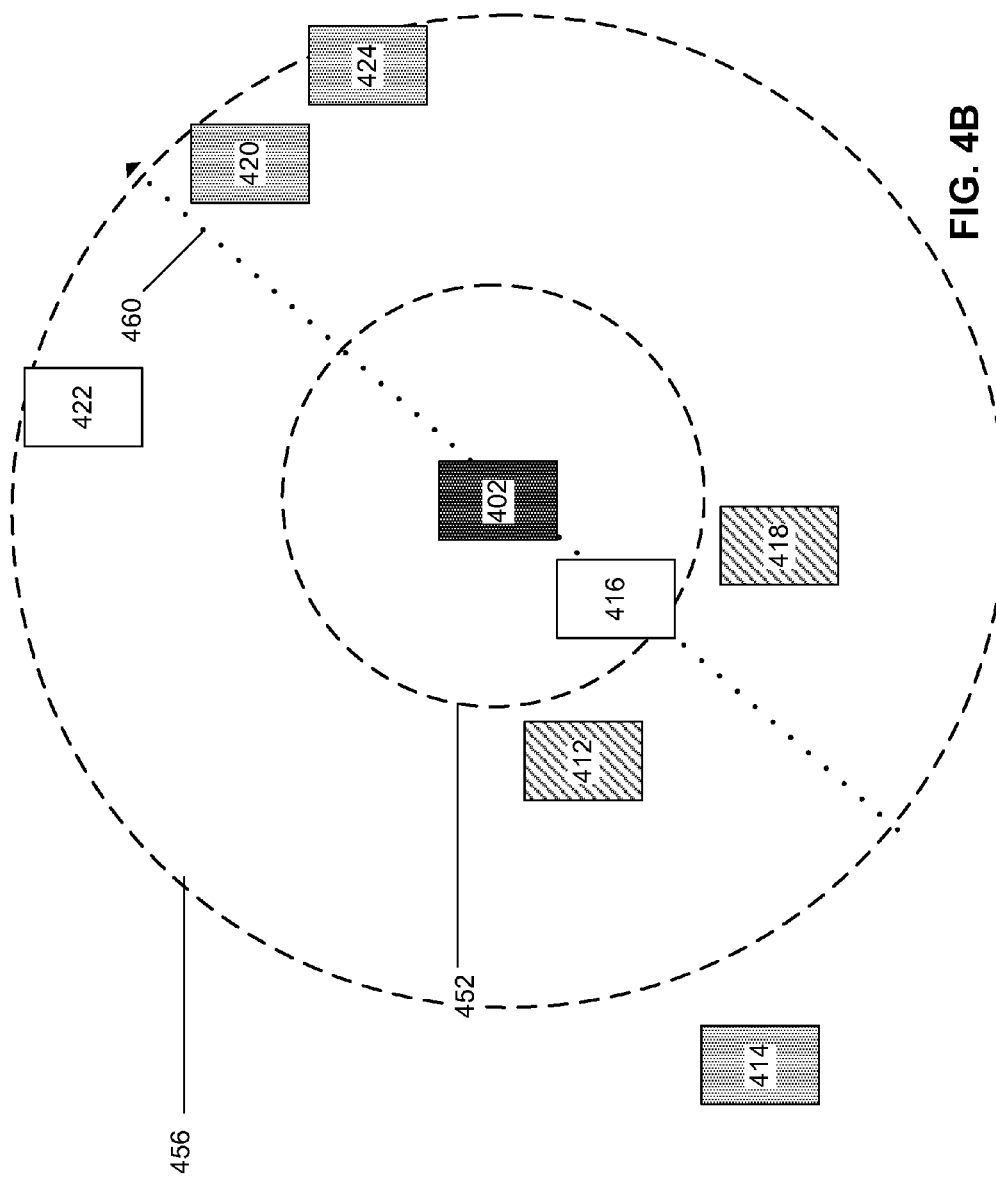

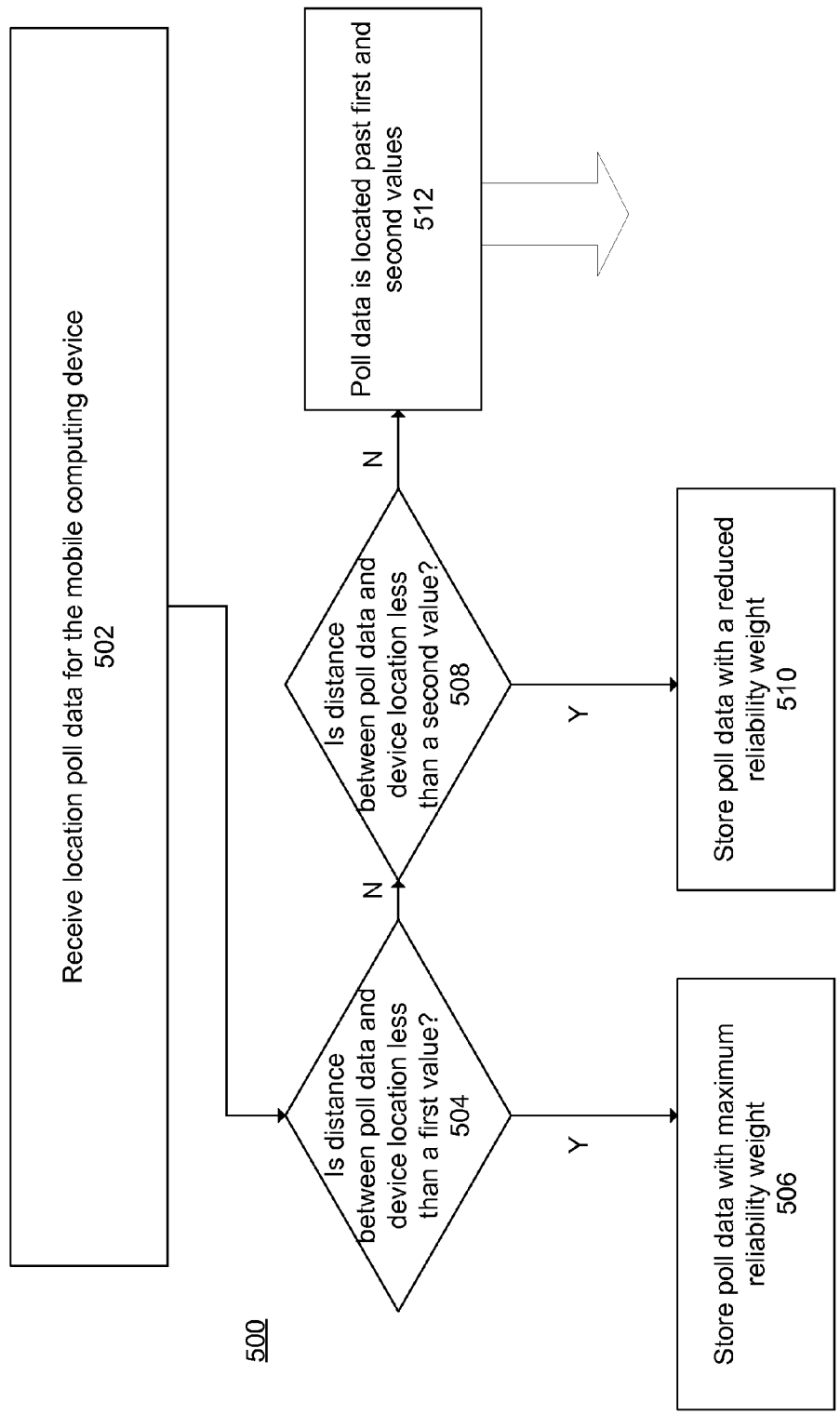

TRILATERATION PROCESSING OF ABNORMAL LOCATION DATA

CROSS-REFERENCE TO RELATED APPLICATION

This application is a U.S. National Phase application under 35 U.S.C. §371 of International Application No. PCT/CN2012/087828, filed Dec. 27, 2012, entitled "TRILATERATION PROCESSING OF ABNORMAL LOCATION DATA," the entire contents of which are incorporated herein by reference.

FIELD

Embodiments of the invention generally pertain to computing devices and more particularly to mobile computing device location identification processes via trilateration.

BACKGROUND

In geometry, trilateration (often alternatively referred to as triangulation) is the process of determining the absolute or relative location of a point in space by measurement of distances, using the geometry of circles, spheres or triangles. Location determination processes, such as Global Positioning Satellite (GPS) services, often use some form of trilateration.

For Wi-Fi (as defined, for example, by 802.11-2012—IEEE Standard for Information technology—Telecommunications and information exchange between systems Local and metropolitan area networks), a station (STA) is any device that contains an IEEE 802.11—conformant medium access control (MAC) and physical layer (PHY) interface to wireless medium (WM).

Trilateration may also be used for indoor location based services where a stationary or mobile device functioning as an STA is capable of receiving Wi-Fi beacon frames from multiple peer devices (PDs), such as Wi-Fi Access Points, laptops, mobile computing devices, beacons and/or fixed devices. PDs are used as reference points in trilateration processes, with the distance between the STA and PD being calculated using wireless signal strength measurements and a wireless propagation model (e.g., Freespace Path Loss Model or Two Ray Model).

Variations in the reliability of STAs can cause inaccuracies in trilateration calculations.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIG. 4A and FIG. 4B illustrate determining a position for a Wi-Fi station based on received poll location data according to an embodiment of the invention.

FIG. 5A and FIG. 5B are flow diagrams of processes for improved trilateration results according to embodiments of the invention.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DESCRIPTION

Embodiments of an apparatus, system and method for validating and utilizing abnormal location beacons are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Trilateration (often alternatively referred to as triangulation) describes processes utilizing geometric shapes such as circles, spheres or triangles for determining the absolute or relative location of a device. Trilateration may be used for location based services where a stationary or mobile device functioning as a station (STA) is capable of receiving Wi-Fi beacon frames from multiple peer devices (PDs). For example, trilateration may involve determining the intersection points on three circles—wherein the radius of the circles is the distance between the PDs and the STA whose location is being determined.

Embodiments of the invention address how trilateration processes are affected by potentially divergent data received from PDs, and how to utilize this data when calculating the location of a mobile computing device. Embodiments of the invention enhance trilateration processes by improving overall accuracy and performance while taking into account the movement of the device (e.g., direction and speed) and user perception (e.g., limiting oscillations and map update intervals).

Figure 1:
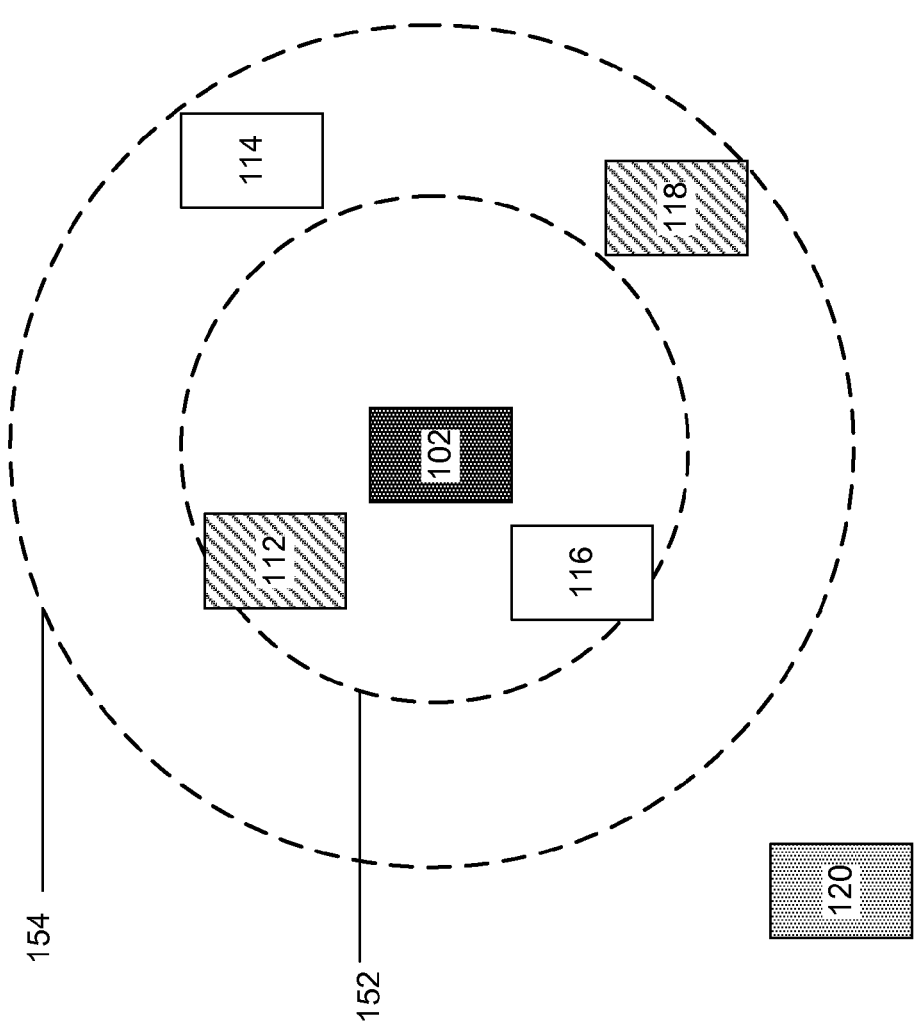
FIG. 1 is an illustration of poll locations for a Wi-Fi station utilized by an embodiment of the invention.

FIG. 1 is an illustration of poll locations for a Wi-Fi station utilized by an embodiment of the invention. FIG. 1 illustrates a mobile computing device STA having calculation location (i.e., position) 102, and poll locations 112, 114, 116, 118 and 120. FIG. 1 illustrates mobile computing device STA 102 receiving poll location data from a variety of PDs. In this example, poll location data entries 112 and 118 are from room/exit beacons, poll location data entry 120 is from a wireless access point, and poll location data entries 114 and 116 are from laptops/mobile computing devices. This configuration is an example only, and is not meant to limit or define the types of PDs that may surround an STA utilizing an embodiment of the invention.

Errors associated with wireless trilaterated location 102 of the mobile computing device STA versus its actual real position may exist. Such errors may be caused by wireless indoor multipath signal propagation, obstacles and noise in the environment. Trilateration processes can provide multiple location measurements per second; however, the measurement error on average may vary from one meter to ten meters or more. This may result in significant random oscillation of the final determined location and also provide a poor user experience. Furthermore, prior trilateration processes do not filter results, do not account for user perception (over a period of time) and do not account for the physical movement of the person carrying the mobile computing device (e.g., how fast they are walking, whether they are standing still, what direction they are moving in, how often the map display is refreshed, etc.).

Levels of dampening may be applied that incorporate realistic physical movement of the device while also accounting for map update periods to collate measurements over a period of time.

The movement of the client device may be obtained from monitoring an included accelerometer—it is possible to measure whether a person holding the device is stationary or walking and potentially even if their gait is fast or slow. The direction of the device may be obtained from a magnetometer combined with an estimation of the resulting motion vector given prior location measurements.

In this embodiment, two hypothetical levels (e.g., concentric rings) around the client device performing the trilateration are defined—i.e., an "inner-ring" and an "outer-ring". The radius of each ring may be determined based on both the limitations of the technology and the velocity of the device. As illustrated in this example, poll locations 112 and 116, shown to be within ring 152, are stored as the more reliable calculated locations, while poll locations 114 and 118, shown outside ring 152 but inside ring 154, are stored with a reduced reliability value. Poll location 120, shown to be outside both rings 152 and 154, may initially be considered an "outlier" and be disregarded from calculations for determining the location of the mobile computing device STA.

For purposes of explanation, the following variables may be defined as:
  Sample period T=time between map updates; to reach high levels of accuracy, embodiments of the invention may utilize multiple samples per second during motion;
  P=Current poll location (xl, yl);
  W=weight associated with current poll (P);
  L=Previous calculated location;
  V=Velocity (estimated based on accelerometer);
  Ri=Inner-ring radius, based on technology accuracy limitations+velocity adjustment;
  Ro=Outer-ring radius based on a multiple of the inner ring (e.g. three times Ri).

The following is an example of how ring size may be calculated. Assuming a 10 m accuracy limitation for the mobile computing device, a technology multiplier of three, a velocity adjustment of V times three, and a moving speed of 1 m per polling period:

$$Ri = 10 \text{ m} + (1 \text{ m} \times 3); \text{ and}$$

$$Ro = (10 \text{ m} + (1 \text{ m} \times 3)) \times 3.$$

Thus, ring 152, in the above example, is calculated as 13 m, while ring 154 is calculated as 39 m.

Assuming the device is stationary (i.e., velocity is zero) embodiments of the invention may further reduce the ring size for each poll period as the device's location begins to stabilize (the first polls may be deemed as less trustworthy until the process averages the location). To do this, embodiments of the invention may adjust weight for L (i.e., trust it less), and gradually reduce the ring size for each poll until we reach zero. For example, if ring size is reduced by a chosen value of 1/10, then after 10 polls a velocity multiplier of zero is utilized.

Once ring size has been determined, if the current poll (P) is outside outer ring 154—such as poll location 120, it may be classified as an outlier and given the lowest weight. If the current poll is between inner ring 152 and outer ring 154—such as poll locations 112 and 118, it may be included in the new distance calculation with a reduced weight since it is farther than expected for a non-moving device. If the current poll is within inner ring 152—such as poll locations 114 and 116, it may be included in the new distance calculation with a weight of 1.

Thus, the calculation of reliability weights for stationary devices may be represented as:
  if (distance(P, L)>=Ro), then the weight associated with P is set to zero: (W=0);
  if (Ro>distance(P, L)>=Ri), then the weight (W) associated with P is a reduced reliability weight (i.e., predetermined dampened value) such as 0.25: (W=0.25);
  if (distance(P, L)<Ri), then the weight W associated with P will be 1: (W=1).

L may then be calculated as follows: $L = L_{new} = 1/n (N*L_{prev} + (P - L_{prev})*W)$, where W for the previous poll samples was determined in previous iterations and n is the number of polls since the last time when the velocity (V) changed to zero. In other words a weighted average over the time the device stayed stationary is calculated. L is stored and the process waits for the next sample period T.

There are valid reasons for why a radical change in a location beacon may not be an outlier but instead a valid data point. For example, a user may initially be at a location where the PDs are configured erroneously (e.g., PDs concentrated in one single area); thus, a user may get readings that erroneously indicate a specified location, but as the user exists that area, significantly different readings (i.e., correct readings) are received. If these readings are simply ignored as "outliers," then a corrected position will not be calculated. Embodiments of the invention describe devices and processes for considering these types of points for recalculating STA positions.

Figure 2A:
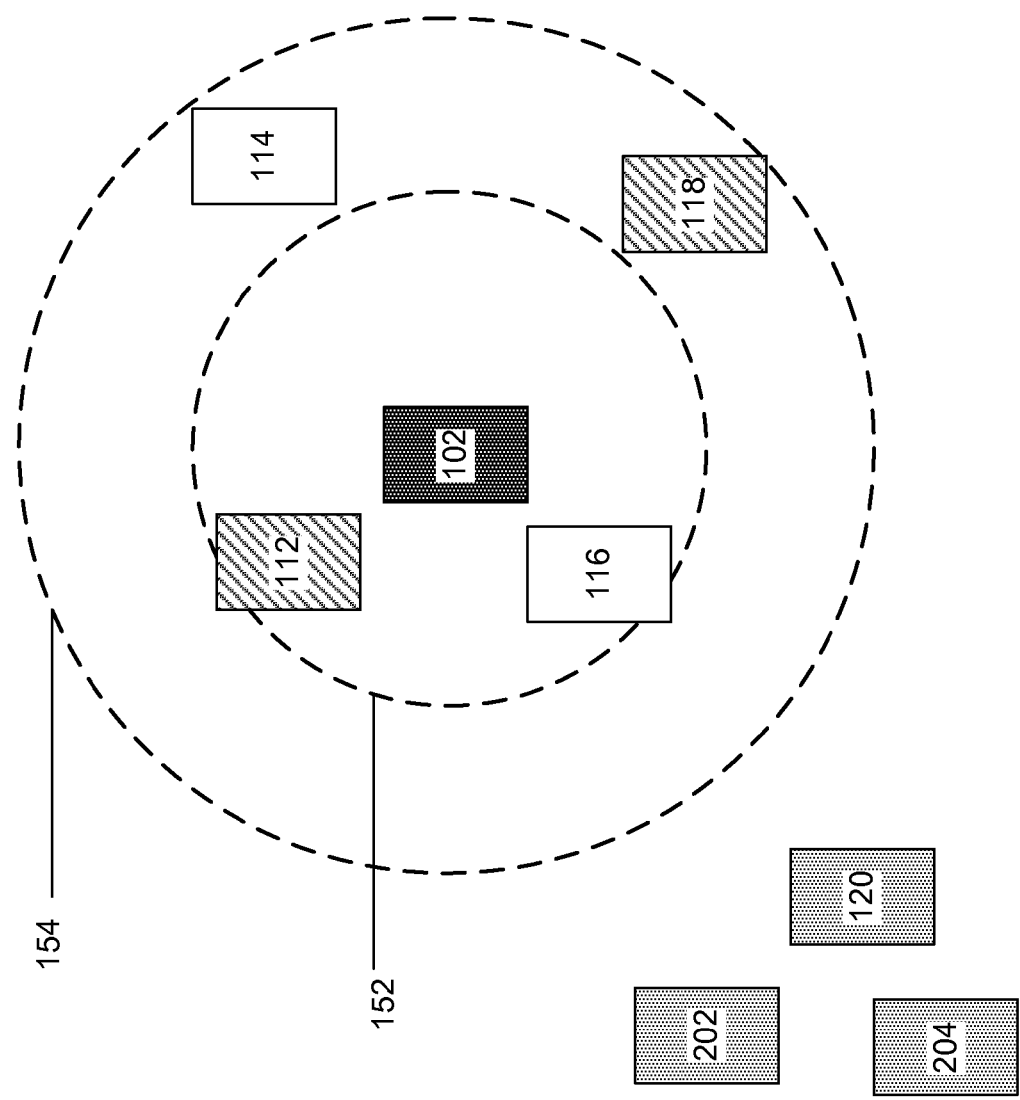
FIGS. 2A and 2B are illustrations of determining a position for a Wi-Fi station based on received poll location data according to an embodiment of the invention.
Figure 2B:
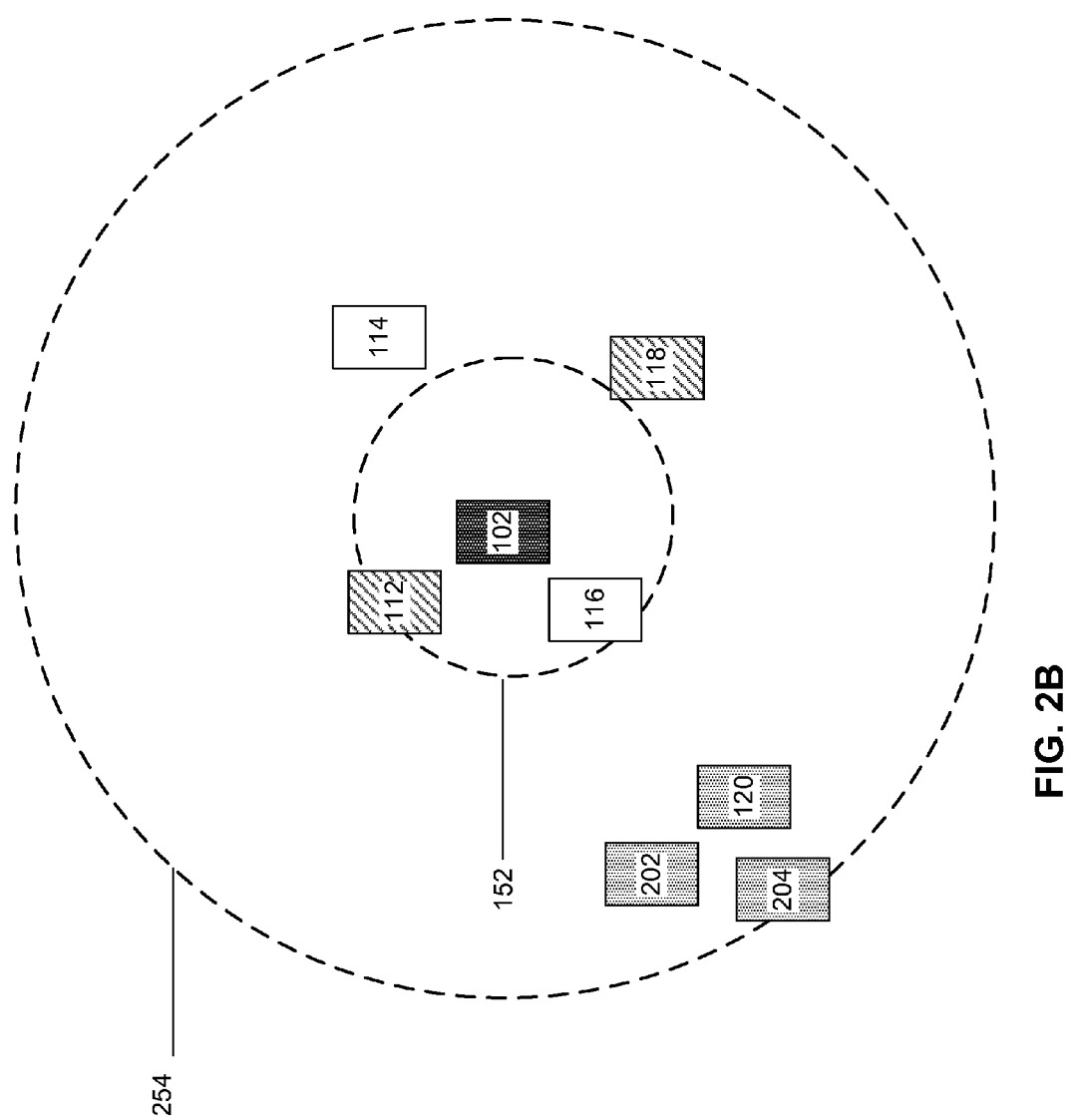

FIGS. 2A and 2B are illustrations of determining a position for a Wi-Fi station based on received poll location data according to an embodiment of the invention. In this embodiment, the calculated mobile computing device STA location and received poll data of FIG. 1 are shown.

In this example, additional poll locations 202 and 204 are shown in FIG. 2A to be received. These received poll locations are close to "outlier" 120. In response to receiving multiple "outlier" poll locations, embodiments of the invention expand the above described "outer-ring," shown as ring 254 in FIG. 2B, to including these locations. Thus, the calculations described above would be used with the radius of ring 254 replacing the radius of ring 154.

Figure 3A:
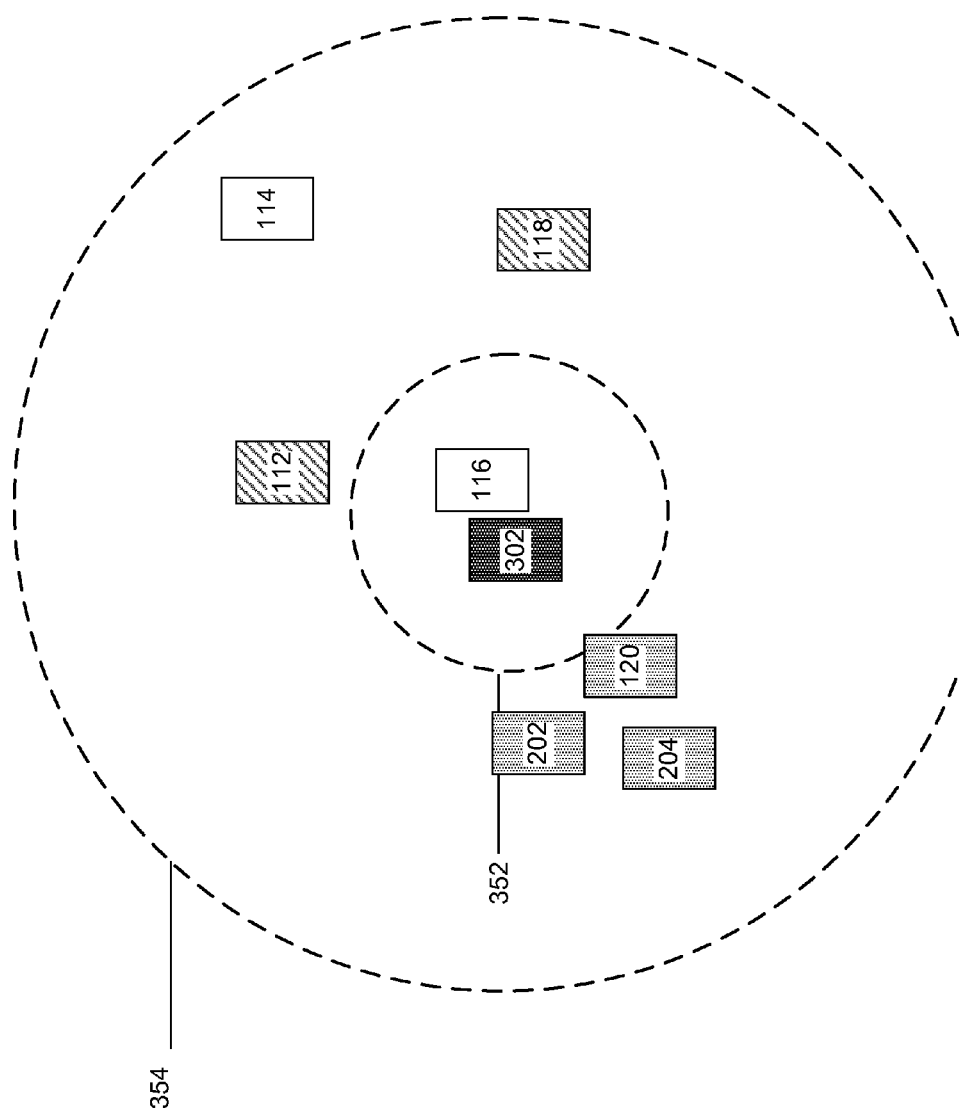
FIG. 3A and FIG. 3B are illustrations of a re-calculated position for a Wi-Fi station based on received poll location data according to an embodiment of the invention.
Figure 3B:
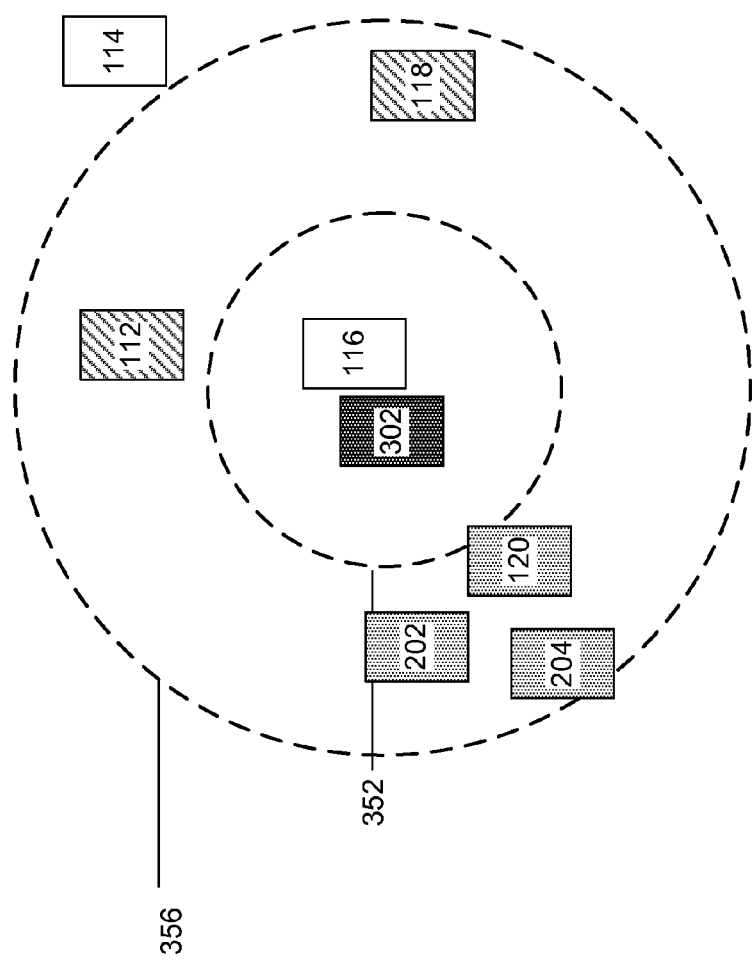

FIG. 3A and FIG. 3B are illustrations of a re-calculated position for a Wi-Fi station based on received poll location data according to an embodiment of the invention. In this embodiment, the received poll data of FIG. 1 and FIG. 2 are shown. Re-calculated position 302 is shown based on the inclusion of (previously) outlier poll data locations 120, 202 and 204 being including within outer-ring 254 of FIG. 2. Thus, the inner-rings and outer-rings are re-positioned to rings 352 and 354 as shown.

To improve accuracy of further mobile computing device STA location calculations, embodiments of the invention may re-calibrate the outer-ring to collapse to a size consistent with previous calculations. FIG. 3B illustrates new outer-ring 356, which in this example is based on the above described outer-ring criteria (e.g., a multiple of the radius of inner ring 352). For this updated outer ring, poll data 114 is now considered as an outlier, and may have its reliability affected as described above.

For purposes of explanation, the following variables may be defined as:

J_increase=the rate to adjust the outer ring to the presence of perceived outliers;
J_decrease=the rate to adjust the outer ring back after taking into consideration the presence of said outliers;
S=readings inside either the outer ring, or both the inner and outer ring
Stability_checkpoint=a tracking variable used to determine stability as described below;
R_o_new=the updated outer ring radius;
R_o_prev=the previous outer ring radius (i.e., before the adjustment to include the outlier).

Thus, an example calculation for adjusting the outer ring size may be:

$$R\_o\_new = R\_o\_prev + f(R\_o\_prev, P, L, J\_increase).$$

In some embodiments, the calculation for adjusting the outer ring size may also be a function of the velocity of the device.

One such example for f is R_o_prev+|L−P|/J_increase. To use the example discussed above with respect to outer ring 154 of FIG. 1: the previous outer ring size was 39, L was 0, the new reading was 100, and it is desired to adjust the outer ring based on J_increase=10; in this example, the outlier pole reading is ignored and the outer ring radius is increased to be 39+|0−100|/10=49.

Thus, for this embodiment, R_o increases to the point of including outlier readings, assuming they are valid (e.g., a plurality of similar poll location readings were received, or the outlier poll reading is consistent with the direction of the movement of the device).

In some embodiments, the size of R_o is subsequently decreased back to a stable state once the outlier poll location (or locations) is within the outer ring. Thus, an example calculation for re-adjusting the outer ring size may be:

$$R\_o\_new = f\_delta(R\_o\_old, R\_o\_base, J\_decrease, Stability\_checkpoint)$$

The presence of outliers may be tracked via a variable, such as 'Stability_checkpoint'. If poll locations received are non-outliers, this variable may be increased (e.g., incremented). In the presence of outliers, this variable may be decreased (e.g., decremented, or set to zero).

Such calculations allow for stabilizing the outer ring size if it is determined that poll samples have returned to a point of stability, but also allows for a more gradual decrease (this allows the system the flexibility between the sharp resets and the more gradual resets).

An example algorithm for adjusting outer ring sizes may be:

```
If (Stability_checkpoint = −1)
    then R_o_new = f(R_o_old, R_o_base, J_decrease,
        Stability_checkpoint)
    (Stability_checkpoint may be set to −1 to allowing a user to
    circumvent a sharp reset)
else If (Stability_checkpoint ≥ S)
    then R_o_new = R_o_base).
Else
    R_o_new = f(R_o_old, R_o_base, J_decrease,
    Stability_checkpoint)
```

Figure 4A:
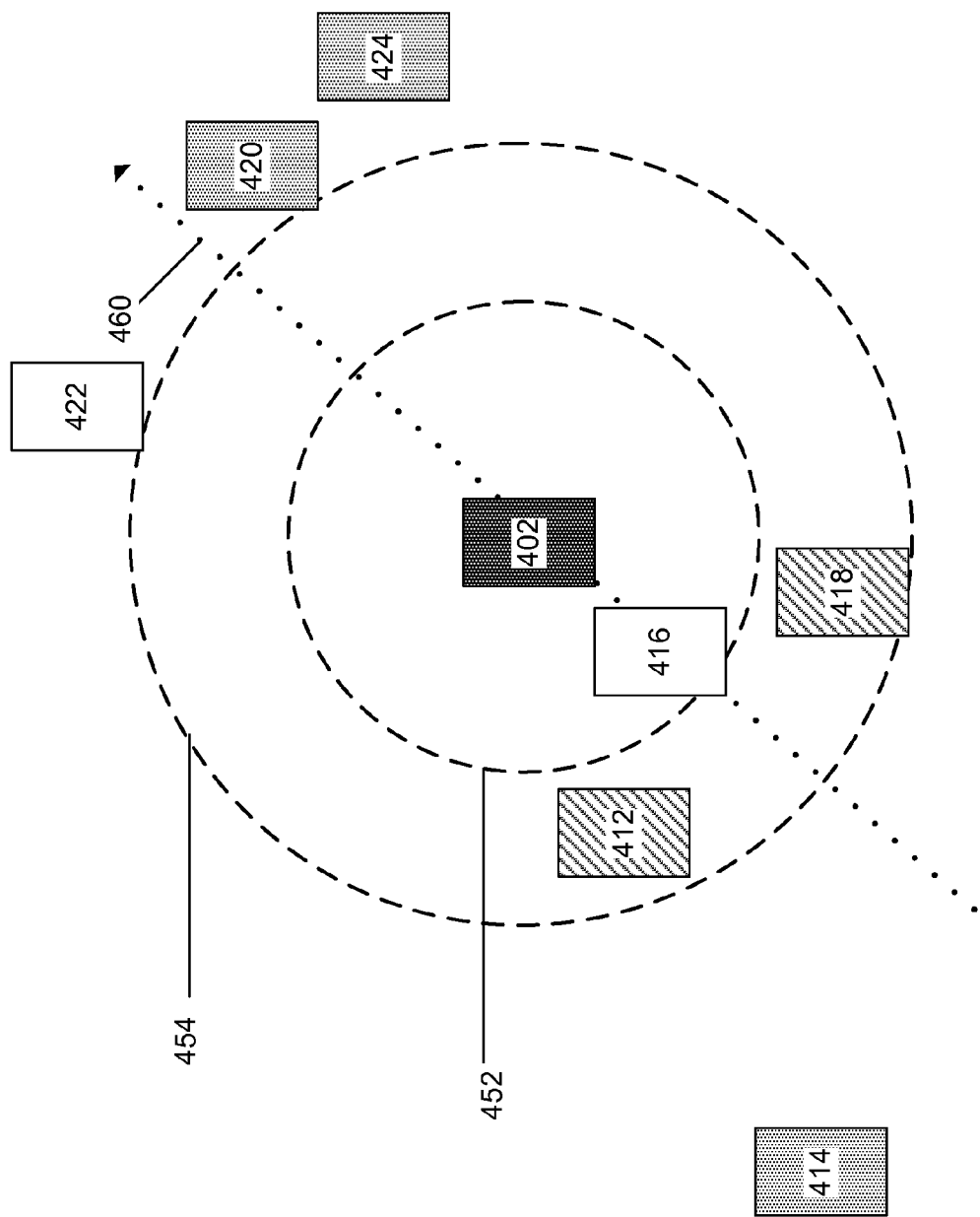

FIG. 4A and FIG. 4B illustrate determining a position for a Wi-Fi station based on received poll location data according to an embodiment of the invention. In this embodiment a mobile computing device STA having calculated location (i.e., position) 402 receives poll locations 412, 414, 416, 418, 420, 422 and 424. As described above, this embodiment utilizes inner-circle 452 and outer circle 454 when calculating the position of the mobile computing device STA.

In this embodiment, the mobile computing device STA is shown to be moving in direction 460. Thus, when expanding the outer ring as described above, embodiments of the invention may select the new radius based on outlying poll locations received towards direction 460.

As shown in FIG. 4B, expanded outer ring 456 is sized to include poll-locations 420, 422 and 424; poll location 414 is still an outlier. In some embodiments, poll location 414 is either disregarded or given a more reduced reliability weight compared to other received poll locations.

Figure 5B:
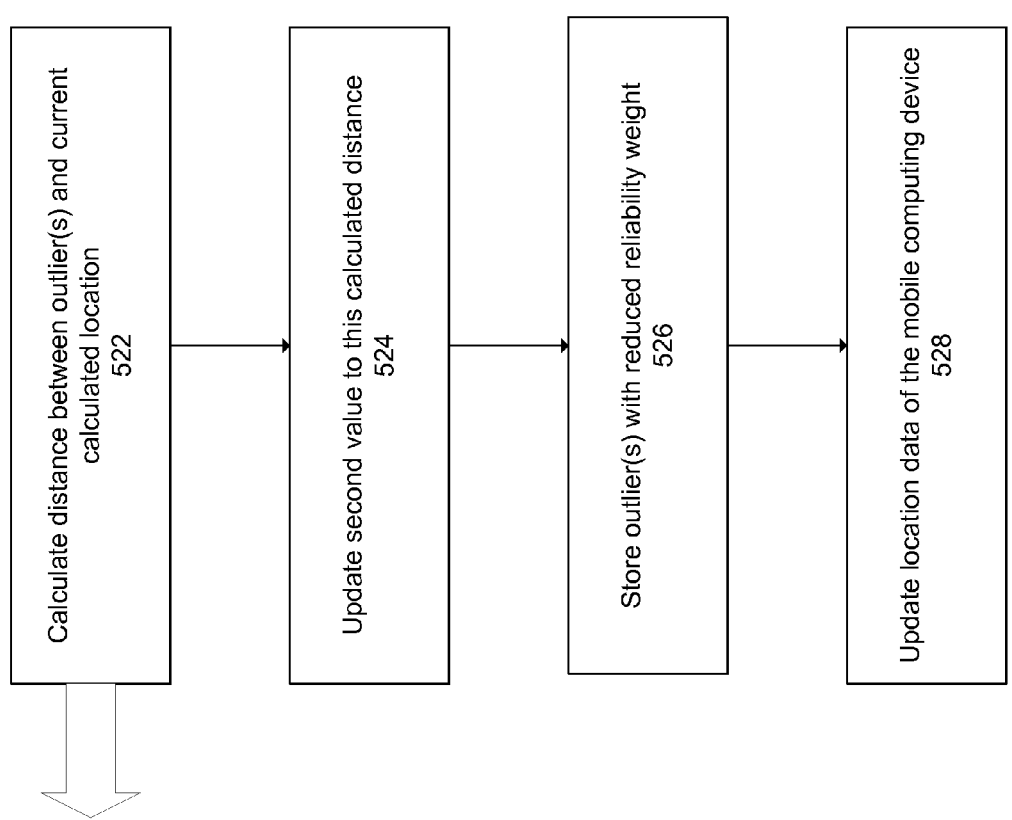

FIG. 5A and FIG. 5B are flow diagrams of processes for improved trilateration results according to embodiments of the invention. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

Process 500 includes operations for receiving location poll data for a mobile computing device STA, 502. If the location poll data is within a first value (i.e., within an inner ring as described above), 504, it is stored with the maximum reliability weight, 506 (e.g., a weight of one). If the location poll data is between first and second values (i.e., between inner and outer rings as described above), 508, then the location poll data is stored with a reduced reliability weight, 510 (e.g., a non-zero value less than one). If the location poll data is outside of the first and second values, 512, then the location data may be classified as an outlier and processes for selective inclusion of the poll data may be executed.

An example process for considering outlier poll location data is illustrated in FIG. 5B. A distance between the outlier data and the current calculated location data for the STA is determined, 522. For embodiments that take into account multiple outlier poll locations, embodiments may use the farther outlier poll location when determining this distance. The above described second value (i.e., outer ring) is updated to be this calculated distance, 524 (i.e., the outer ring has its radius increased to this calculated distance). Now that the outlier data point(s) are within the updated second ring, these poll locations are dampened with the above described reduced reliability weight, 526, and the location data for the STA is updated, 528. In some embodiments, the above described second value may subsequently be reset to its initial value (e.g., the outer ring has its radius gradually decreased to its initial value).

Figure 6:
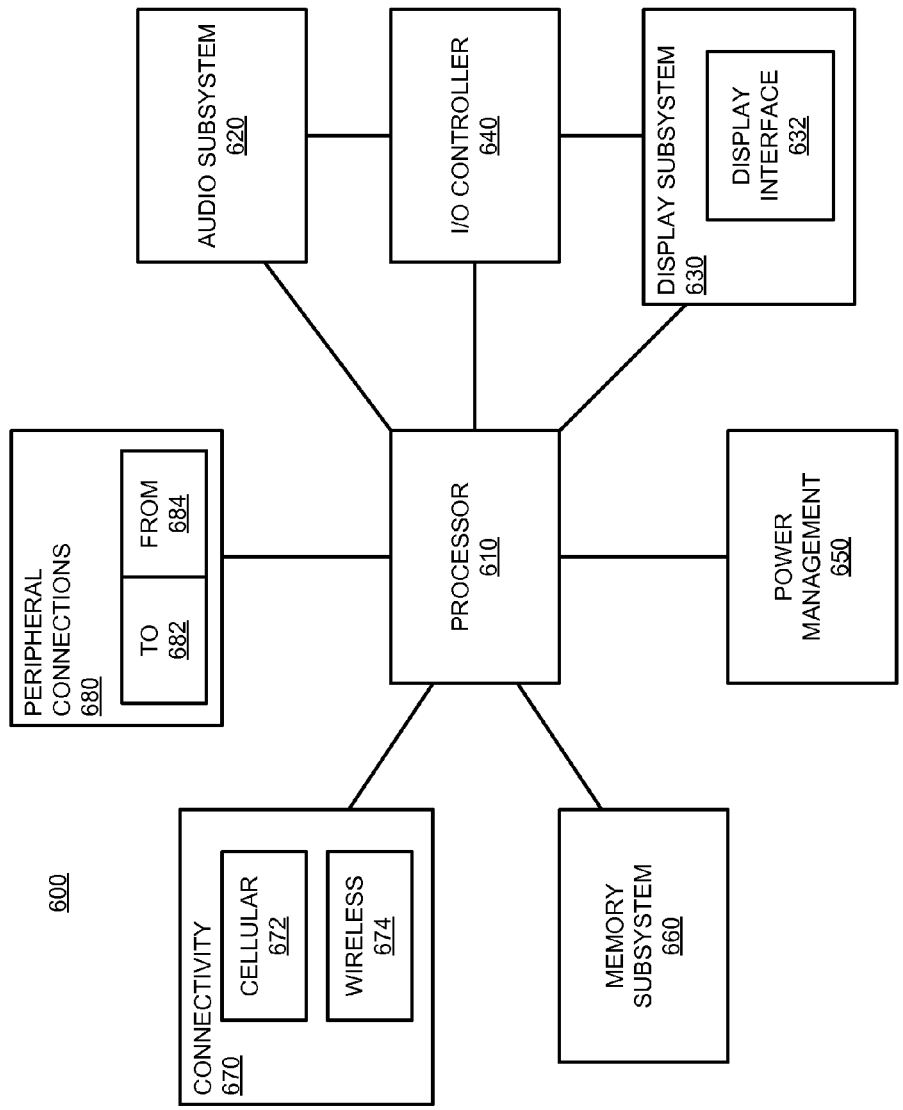
FIG. 6 is a block diagram of a device incorporating an embodiment of the invention.

FIG. 6 is a block diagram of a device incorporating an embodiment of the invention. Computing device 600 represents a mobile computing device, such as a computing tablet, a mobile phone or smartphone, a wireless-enabled e-reader, or other wireless mobile device. It will be understood that certain of the components are shown generally, and not all components of such a device are shown in device 600.

Device 600 includes processor 610, which performs the primary processing operations of device 600. Processor 610 can include one or more physical devices, such as microprocessors, application processors, microcontrollers, programmable logic devices, processor cores, or other processing means. The processing operations performed by processor 610 include the execution of an operating platform or operating system on which applications and/or device functions are executed. The processing operations include operations related to I/O (input/output) with a human user or with other devices, operations related to power management, and/or operations related to connecting device 600 to another device. The processing operations may also include operations related to audio I/O and/or display I/O.

In one embodiment, device 600 includes audio subsystem 620, which represents hardware (e.g., audio hardware and audio circuits) and software (e.g., drivers, codecs) components associated with providing audio functions to the computing device. Audio functions can include speaker and/or headphone output, as well as microphone input via any of the audio jacks described above. Devices for such functions can be integrated into device 600, or connected to device 600. In one embodiment, a user interacts with device 600 by providing audio commands that are received and processed by processor 610.

Display subsystem 630 represents hardware (e.g., display devices) and software (e.g., drivers) components that provide a visual and/or tactile display for a user to interact with the computing device. Display subsystem 630 includes display interface 632, which includes the particular screen or hardware device used to provide a display to a user. In one embodiment, display interface 632 includes logic separate from processor 610 to perform at least some processing related to the display. In one embodiment, display subsystem 630 includes a touchscreen device that provides both output and input to a user.

I/O controller 640 represents hardware devices and software components related to interaction with a user. I/O controller 640 can operate to manage hardware that is part of audio subsystem 620 and/or display subsystem 630. Additionally, I/O controller 640 illustrates a connection point for additional devices that connect to device 600 through which a user might interact with the system. For example, devices that can be attached to device 600 might include microphone devices, speaker or stereo systems, video systems or other display device, keyboard or keypad devices, or other I/O devices for use with specific applications such as card readers or other devices.

As mentioned above, I/O controller 640 can interact with audio subsystem 620 and/or display subsystem 630. For example, input through a microphone or other audio device can provide input or commands for one or more applications or functions of device 600. Additionally, audio output can be provided instead of or in addition to display output. In another example, if display subsystem includes a touchscreen, the display device also acts as an input device, which can be at least partially managed by I/O controller 640. There can also be additional buttons or switches on device 600 to provide I/O functions managed by I/O controller 640.

In one embodiment, I/O controller 640 manages devices such as accelerometers, cameras, light sensors or other environmental sensors, or other hardware that can be included in device 600. The input can be part of a direct user interaction, as well as providing environmental input to the system to influence its operations (such as filtering for noise, adjusting displays for brightness detection, applying a flash for a camera, or other features). In one embodiment, device 600 includes power management 650 that manages battery power usage, charging of the battery, and features related to power saving operation.

Memory subsystem 660 includes memory devices for storing information in device 600. Memory can include nonvolatile (state does not change if power to the memory device is interrupted) and/or volatile (state is indeterminate if power to the memory device is interrupted) memory devices. Memory 660 can store application data, user data, music, photos, documents, or other data, as well as system data (whether long-term or temporary) related to the execution of the applications and functions of system 600.

Connectivity 670 includes hardware devices (e.g., wireless and/or wired connectors and communication hardware) and software components (e.g., drivers, protocol stacks) to enable device 600 to communicate with external devices. The device could be separate devices, such as other computing devices, wireless access points or base stations, as well as peripherals such as headsets, printers, or other devices.

Connectivity 670 can include multiple different types of connectivity. To generalize, device 600 is illustrated with cellular connectivity 672 and wireless connectivity 674. Cellular connectivity 672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity 674 refers to wireless connectivity that is not cellular, and can include personal area networks (such as Bluetooth), local area networks (such as Wi-Fi), and/or wide area networks (such as Wi-Max), or other wireless communication. Connectivity 670 may receive Wi-Fi beacons, used to execute the trilateration processes of embodiments of the invention described above.

Peripheral connections 680 include hardware interfaces and connectors, as well as software components (e.g., drivers, protocol stacks) to make peripheral connections. It will be understood that device 600 could both be a peripheral device ("to" 682) to other computing devices, as well as have peripheral devices ("from" 684) connected to it. Device 600 commonly has a "docking" connector to connect to other computing devices for purposes such as managing (e.g., downloading and/or uploading, changing, synchronizing) content on device 600. Additionally, a docking connector can allow device 600 to connect to certain peripherals that allow device 600 to control content output, for example, to audiovisual or other systems.

In addition to a proprietary docking connector or other proprietary connection hardware, device 600 can make peripheral connections 680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

Thus, embodiments of the invention describe methods, apparatuses and systems for executing processes including operations for receiving location data for a mobile computing device, the location data determined, at least in part, from Wi-Fi data received from one or more other devices; updating a threshold value from a first value to a second value based on a distance between a calculated location of the mobile computing device and the received location data; calculating a revised location of the mobile computing device using the received location data and a plurality of stored location data, wherein calculating the revised location includes applying a reduced reliability weight to one of the location data values if its distance from the calculated location of the mobile computing device is greater than a first distance value and less the threshold value; and changing the threshold value to the first value. In some embodiments, said first value of the threshold value is a multiple of the first distance value.

In some embodiments, said executed processes further include operations for determining the mobile computing device is non-stationary, and determining a directional vector for the mobile computing device, wherein calculating the revised location of the mobile computing device is in response to determining the received location data is towards the directional vector of the mobile computing device. Determining said directional vector of the mobile computing device may be based, at least in part, on sensor data received from at least one of an accelerometer or a compass.

In some embodiments, said executed processes further include operations for calculating the revised location by applying a second reduced reliability weight to retrieved location data entries greater than the threshold value. For example, said second reduced reliability weight may be zero, or non-zero dampening value.

In some embodiments, wherein the received location data comprises a plurality of location data values, said executed processes further include operations for determining an area including a majority of the received location data values, and selecting the received location data values in the determined area for calculating the revised location of the mobile computing device.

Various components referred to above as processes, servers, or tools described herein may be a means for performing the functions described. Each component described herein includes software or hardware, or a combination of these. Each and all components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration) may be provided via an article of manufacture including a non-transitory, tangible computer or machine readable storage medium, which provides content that represents instructions that can be executed. The content may result in a computer performing various functions/operations described herein.

A computer readable non-transitory storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable non-transitory storage medium may also include a storage or database from which content can be downloaded. The computer readable medium may also include a device or product having content stored thereon at a time of sale or delivery. Thus, delivering a device with stored content, or offering content for download over a communication medium may be understood as providing an article of manufacture with such content described herein.

The invention claimed is:

1. A method comprising:
receiving Wi-Fi frames from one or more other devices via wireless transmission;
determining a location data value for a mobile computing device, at least in part, from the Wi-Fi frames received from the one or more other devices;
updating a threshold value from a first value to a second value based on a distance between a calculated location of the mobile computing device and the [received] location data value;
calculating a revised location of the mobile computing device using the received location data value and a plurality of stored location data values, wherein calculating the revised location includes applying a reduced reliability weight to one of the location data values if its distance from the calculated location of the mobile computing device is greater than a first distance value and less than the threshold value; and
changing the threshold value to the first value.

2. The method of claim 1, further comprising:
determining the mobile computing device is non-stationary; and
determining a directional vector for the mobile computing device;
wherein calculating the revised location of the mobile computing device is in response to determining the received location data is towards the directional vector of the mobile computing device.

3. The method of claim 2, wherein determining the directional vector of the mobile computing device is based, at least in part, on sensor data received from at least one of an accelerometer or a compass.

4. The method of claim 1, wherein calculating the revised location further comprises:
applying a second reduced reliability weight to retrieved location data entries greater than the threshold value.

5. The method of claim 4, wherein the second reduced reliability weight is zero.

6. The method of claim 1, wherein the first value of the threshold value is a multiple of the first distance value.

7. The method of claim 1, wherein the received location data comprises a plurality of location data values, and the method further comprises:
determining an area including a majority of the received location data values; and
selecting the received location data values in the determined area for calculating the revised location of the mobile computing device.

8. A mobile computing device comprising:
a processor;
a memory; and
trilateration logic executed via the processor to:
receive a location data value for the mobile computing device, the location data value determined, at least in part, from Wi-Fi data received from one or more other devices;

update a threshold value from a first value to a second value based on a distance between a calculated location of the mobile computing device and the received location data value;

calculate a revised location of the mobile computing device using the received location data value and a plurality of stored location data values, wherein calculating the revised location includes applying a reduced reliability weight to one of the location data values if its distance from the calculated location of the mobile computing device is greater than a first distance value and less than the threshold value; and change the threshold value to the first value.

9. The system of claim 8, the trilateration logic to further:
determine the mobile computing device is non-stationary; and
determine a directional vector for the mobile computing device;
wherein calculating the revised location of the mobile computing device is in response to determining the received location data is towards the directional vector of the mobile computing device.

10. The system of claim 9, wherein determining the directional vector of the mobile computing device is based, at least in part, on sensor data received from at least one of an accelerometer or a compass.

11. The system of claim 8, wherein calculating the revised location further comprises:
applying a second reduced reliability weight to retrieved location data entries greater than the threshold value.

12. The system of claim 11, wherein the second reduced reliability weight is zero.

13. The system of claim 8, wherein the received location data comprises a plurality of location data values, and the trilateration logic to further:
determining an area including a majority of the received location data values; and
selecting the received location data values in the determined area for calculating the revised location of the mobile computing device.

14. A machine-readable non-transitory storage medium having computer executable instructions stored thereon that, when executed, cause a processor to perform a method comprising:
receiving a location data value for a mobile computing device, the location data value determined, at least in part, from Wi-Fi data received from one or more other devices;

updating a threshold value from a first value to a second value based on a distance between a calculated location of the mobile computing device and the received location data value;

calculating a revised location of the mobile computing device using the received location data value and a plurality of stored location data values, wherein calculating the revised location includes applying a reduced reliability weight to one of the location data values if its distance from the calculated location of the mobile computing device is greater than a first distance value and less than the threshold value; and changing the threshold value to the first value.

15. The machine-readable storage medium of claim 14, the method further comprising:
determining the mobile computing device is non-stationary; and
determining a directional vector for the mobile computing device;
wherein calculating the revised location of the mobile computing device is in response to determining the received location data is towards the directional vector of the mobile computing device.

16. The machine-readable storage medium of claim 15, wherein determining the directional vector of the mobile computing device is based, at least in part, on sensor data received from at least one of an accelerometer or a compass.

17. The machine-readable storage medium of claim 14, wherein calculating the revised location further comprises:
applying a second reduced reliability weight to retrieved location data entries greater than the threshold value.

18. The machine-readable storage medium of claim 17, wherein the second reduced reliability weight is zero.

19. The machine-readable storage medium of claim 14, wherein the first value of the threshold value is a multiple of the first distance value.

20. The machine-readable storage medium of claim 14, wherein the received location data comprises a plurality of location data values, and the method further comprises:
determining an area including a majority of the received location data values; and
selecting the received location data values in the determined area for calculating the revised location of the mobile computing device.

* * * * *